(12) United States Patent
Bradley (10) Patent No.: US 10,843,635 B2
(45) Date of Patent: Nov. 24, 2020

(54) CARRIER ASSEMBLY FOR TRANSPORTING HAND TRUCKS

(71) Applicant: Richard T. Bradley, St. Louis, MO (US)

(72) Inventor: Richard T. Bradley, St. Louis, MO (US)

(73) Assignee: Richard T. Bradley, St. Louis, MO (US)

( * ) Notice: Subject to any disclaimer, the term of this patent is extended or adjusted under 35 U.S.C. 154(b) by 0 days.

(21) Appl. No.: 16/664,087

(22) Filed: Oct. 25, 2019

(65) Prior Publication Data

US 2020/0156554 A1    May 21, 2020

Related U.S. Application Data

(60) Provisional application No. 62/768,210, filed on Nov. 16, 2018.

(51) Int. Cl.
*B60R 9/06* (2006.01)
*B60R 11/06* (2006.01)
*B60R 11/00* (2006.01)

(52) U.S. Cl.
CPC .............. *B60R 9/06* (2013.01); *B60R 11/06* (2013.01); *B60R 2011/004* (2013.01); *B60R 2011/0066* (2013.01); *B60R 2011/0071* (2013.01)

(58) Field of Classification Search
CPC ..... B60R 9/06; B60R 11/06; B60R 2011/004; B60R 2011/0071; B60R 2011/0066
USPC .................................................. 414/462–466
See application file for complete search history.

(56) References Cited

U.S. PATENT DOCUMENTS

| | | | | |
|---|---|---|---|---|
| 3,443,730 A | * | 5/1969 | Meusel ...................... | B60R 9/06 224/536 |
| 5,236,342 A | * | 8/1993 | Pellettier ................. | B60R 11/06 224/512 |
| 5,522,530 A | * | 6/1996 | Boettcher ................. | B60R 9/06 224/282 |
| 5,673,834 A | * | 10/1997 | Cannon ................... | B60R 9/048 224/488 |
| 5,738,261 A | * | 4/1998 | Dula ......................... | B60R 9/06 224/282 |
| 5,853,278 A | * | 12/1998 | Frantz ...................... | B60R 9/06 414/462 |
| 6,007,290 A | * | 12/1999 | Schulz ...................... | B60R 9/06 414/462 |

(Continued)

FOREIGN PATENT DOCUMENTS

WO    2014058997 A1    4/2014

*Primary Examiner* — Lynn E Schwenning
(74) *Attorney, Agent, or Firm* — Stinson LLP (57) ABSTRACT

A carrier assembly for transporting one or more hand trucks includes a platform having an upper surface configured to support a hand truck, a mount configured to couple the platform to a vehicle such that the upper surface of the platform is positioned to support the hand truck at a first elevation, a support extending generally perpendicular to the upper surface of the platform, and a retainer extending generally parallel to the upper surface of the platform. The support and retainer are each configured to restrict a movement of the hand truck when the hand truck is supported at the first elevation. The retainer is moveable between an engaged configuration and a disengaged configuration.

20 Claims, 10 Drawing Sheets

(56) References Cited

U.S. PATENT DOCUMENTS

| | | | | |
|---|---|---|---|---|
| 6,427,891 B1* | 8/2002 | Anderson | ................. | B60R 9/06 |
| | | | | 224/42.38 |
| 6,769,858 B1* | 8/2004 | Butler | .................. | B60P 1/4421 |
| | | | | 414/462 |
| 6,786,373 B2* | 9/2004 | Pierce | .................... | B60R 11/06 |
| | | | | 224/501 |
| 7,341,417 B1* | 3/2008 | Lohr | ......................... | B60R 9/06 |
| | | | | 224/506 |
| 8,475,109 B2 | 7/2013 | Torrison | | |
| 8,657,552 B1* | 2/2014 | Raney | .................. | B62B 5/0003 |
| | | | | 224/501 |
| 10,214,227 B1 | 2/2019 | Taylor et al. | | |
| 2011/0198142 A1* | 8/2011 | Allingham | ................ | B60R 9/06 |
| | | | | 180/89.11 |
| 2013/0142602 A1* | 6/2013 | Barnts | .................. | B60P 1/4421 |
| | | | | 414/462 |
| 2019/0375338 A1* | 12/2019 | Deninno | .................. | B60R 9/10 |

* cited by examiner

CARRIER ASSEMBLY FOR TRANSPORTING HAND TRUCKS

CROSS-REFERENCE TO RELATED APPLICATION

This application claims the benefit of U.S. Provisional Application No. 62/768,210, filed Nov. 16, 2018.

BACKGROUND

At least some known hand trucks, also known as hand carts or dollies, have an L-shaped configuration with a planar surface to set objects on at one leg, one or more handles to grab ahold of at the other leg, and one or more wheels at or near the intersection of the two legs. When pivoted or tilted back on its wheels (e.g., so that the planar surface is at least partially off the ground), a hand truck may be rolled to move any objects set on the planar surface safely and/or efficiently. A hand truck may be used, for example, to help load a vehicle with objects (e.g., at a loading site) and/or to help unload objects from a vehicle (e.g., at an unloading site). However, at least some known hand trucks are bulky and unwieldy, presenting an age-old dilemma: whether to free up some cargo space to transport the hand truck to the unloading site, or to utilize the cargo space and find another hand truck at the unloading site.

SUMMARY

In one aspect, a carrier assembly is provided for transporting one or more hand trucks. The carrier assembly includes a platform having an upper surface configured to support a hand truck; a mount configured to couple the platform to a vehicle such that the upper surface of the platform is positioned to support the hand truck at a first elevation; a support extending generally perpendicular to the upper surface of the platform, the support configured to restrict a movement of the hand truck when the hand truck is supported at the first elevation; and a retainer extending generally parallel to the upper surface of the platform, the retainer moveable between an engaged configuration and a disengaged configuration, the retainer configured to restrict a movement of the hand truck when the hand truck is supported at the first elevation.

In another aspect, a method is provided for assembling a system for transporting one or more hand trucks. The method includes coupling a platform to a mount, the platform having an upper surface configured to support a hand truck, the mount configured to couple the platform to a vehicle such that the upper surface of the platform is positioned to support the hand truck at a first elevation; extending a support generally perpendicular to the upper surface of the platform, the support configured to restrict a movement of the hand truck when the hand truck is supported at the first elevation; and extending a retainer generally parallel to the upper surface of the platform, the retainer moveable between an engaged configuration and a disengaged configuration, the retainer configured to restrict a movement of the hand truck when the hand truck is supported at the first elevation.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF THE DRAWINGS

Features, aspects, and advantages of the present disclosure will become better understood when the following Detailed Description is read with reference to the accompanying drawings in which like reference characters represent like elements throughout, wherein.

Although specific features of various examples may be shown in some drawings and not in others, this is for convenience only. Any feature of any drawing may be referenced and/or claimed in combination with any feature of any other drawing.

DETAILED DESCRIPTION

The present disclosure relates to structural assemblies and, more particularly, to a carrier assembly for transporting one or more hand trucks, hand carts, and/or dollies. Examples described herein may be used to transport (e.g., between a loading site and an unloading site) a hand truck without occupying any space within a cabin or trunk of the vehicle. For example, at least some examples may be coupled to a receiver hitch of the vehicle. Examples described herein include a mount coupling a platform to the receiver hitch, and a support and/or retainer configured to restrict a movement of the hand truck when the hand truck is on the platform. The support may extend generally perpendicular to an upper surface of the platform to restrict a horizontal movement of the hand truck, and/or the retainer may extend generally parallel to the upper surface of the platform to restrict a vertical movement of the hand truck. The retainer may be moved between an engaged configuration and a disengaged configuration. In this manner, a hand truck may be selectively secured to at least some of the examples described herein (e.g., at a loading site, for transport to an unloading site).

FIGS. 1-7 show an example carrier assembly 100. The carrier assembly 100 includes a platform 110, a mount 120 extending generally horizontally beyond the platform 110 (e.g., outside a footprint of the platform 110), a support 130 extending generally vertically from the platform 110, and a retainer 140 extending generally horizontally across the platform 110 (e.g., within the footprint of the platform 110).

The platform 110 has a first surface 142 (e.g., an upper surface) that may be oriented to face generally upwardly (e.g., away from the ground). In some examples, the support 130 is generally perpendicular to the upper surface 142 of the platform 110, and/or the retainer 140 is generally parallel to the upper surface 142 of the platform 110. For example, the retainer 140 may extend laterally across the upper surface 142 of the platform 110. Alternatively, the support 130 and/or retainer 140 may extend in any direction or orientation that enables the carrier assembly 100 to function as described herein.

Figure 1:
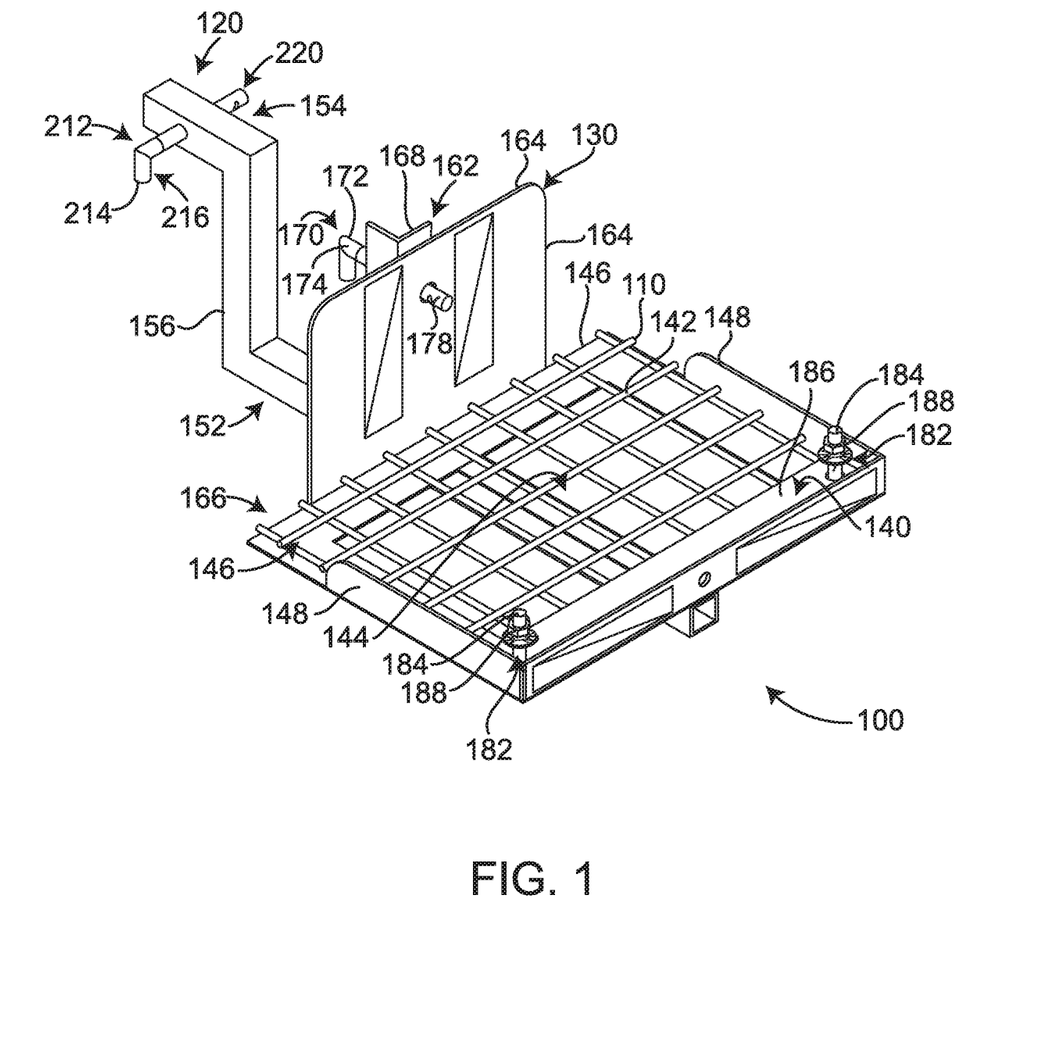
FIG. 1 is a front perspective view of an example carrier assembly.
Figure 2:
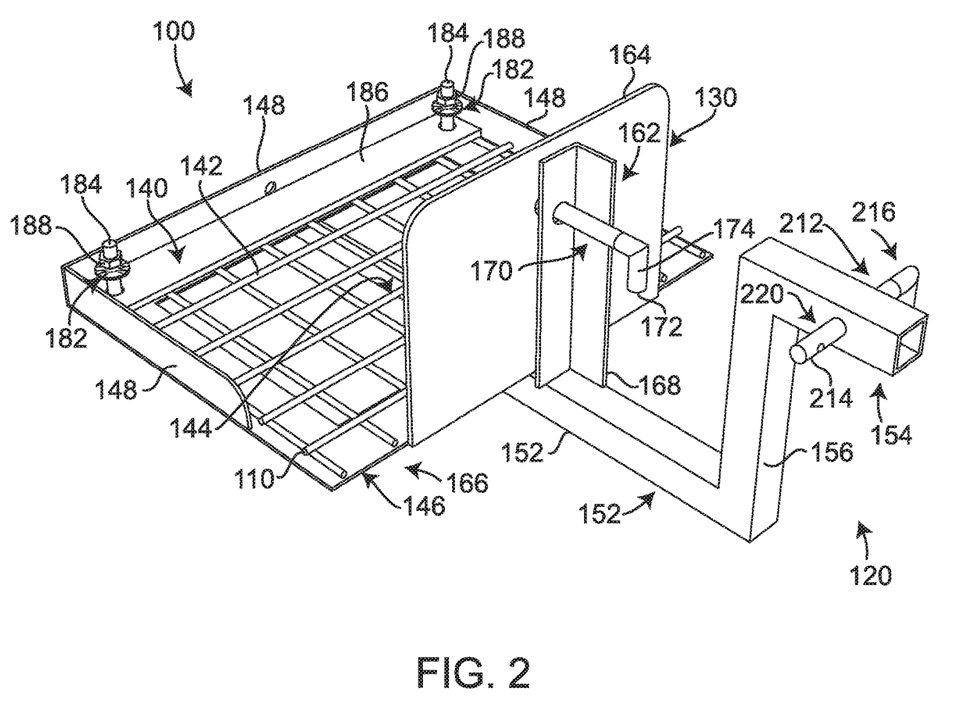
FIG. 2 is a rear perspective view of the carrier assembly shown in FIG. 1.
Figure 3:
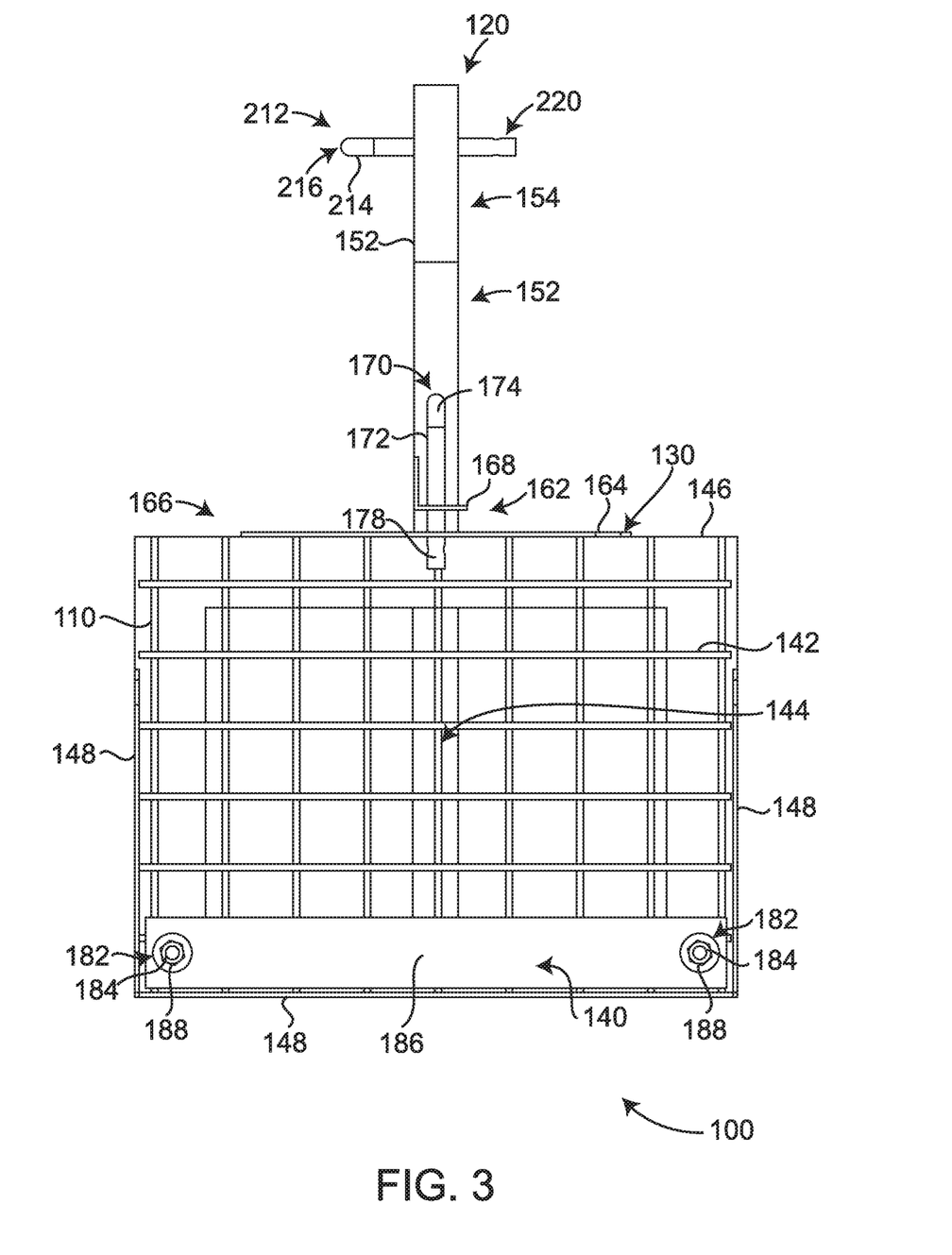
FIG. 3 is a plan view of the carrier assembly shown in FIG. 1.
Figure 4:
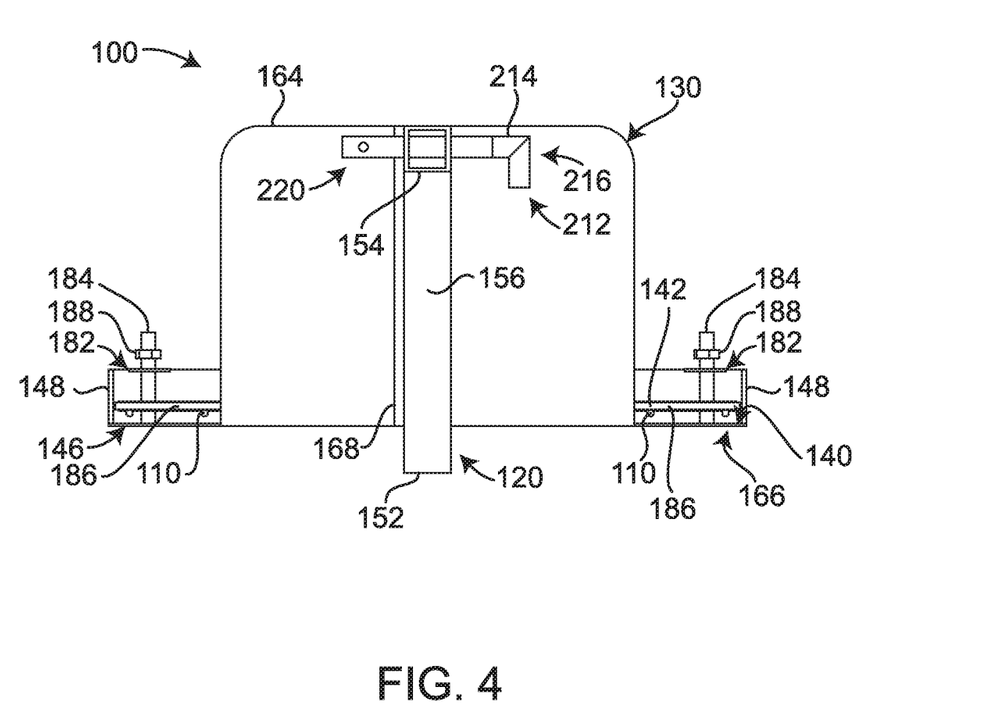
FIG. 4 is a rear view of the carrier assembly shown in FIG. 1.
Figure 5:
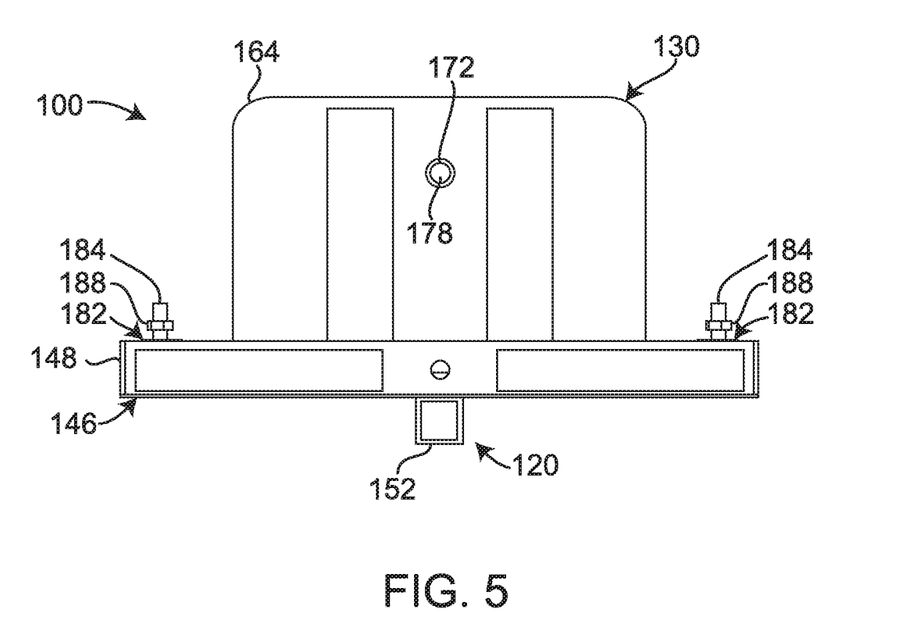
FIG. 5 is a front view of the carrier assembly shown in FIG. 1.
Figure 6:
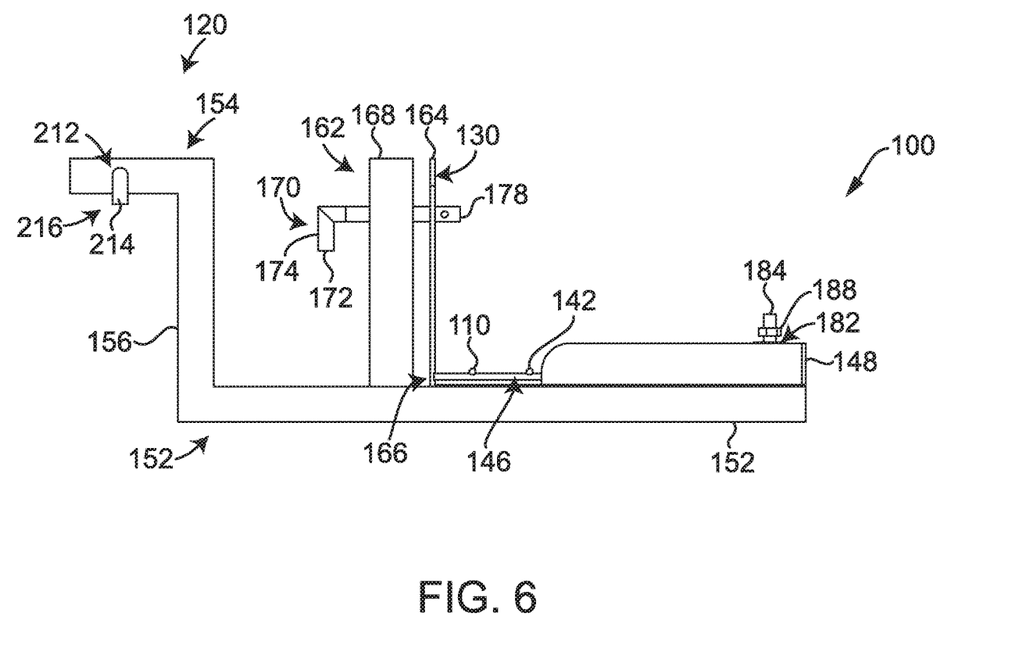
FIG. 6 is a left side view of the carrier assembly shown in FIG. 1.
Figure 7:
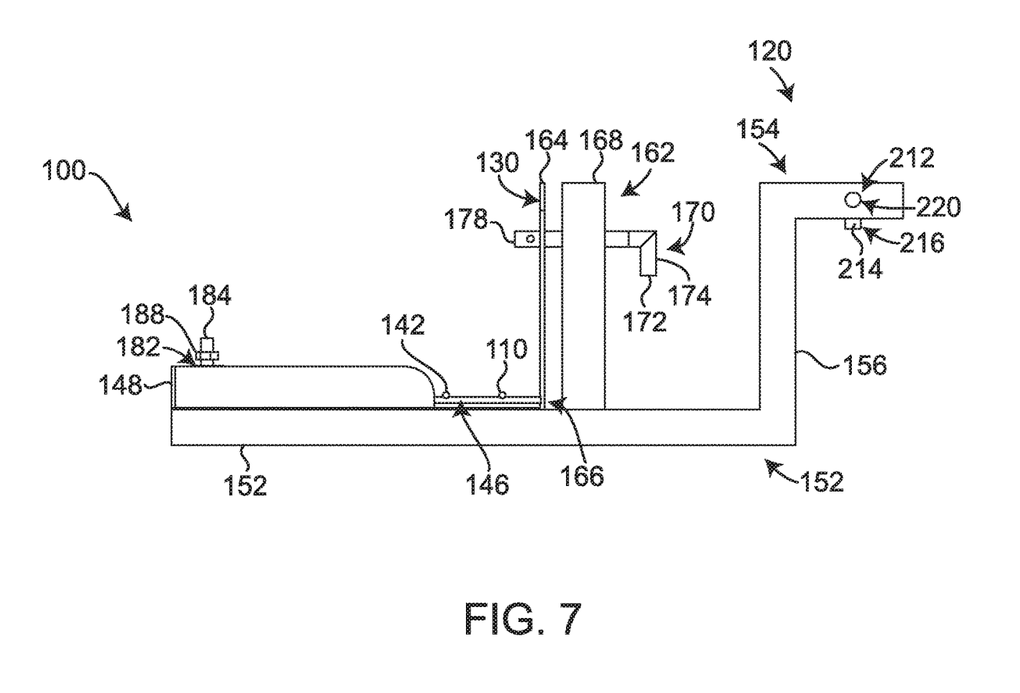
FIG. 7 is a right side view of the carrier assembly shown in FIG. 1.

The upper surface 142 has an inner portion 144 and a peripheral portion 146 extending about the inner portion 144. In some examples, the inner portion 144 of the upper surface 142 is water-permeable and/or is fabricated from a water-permeable material. For example, as shown in FIG. 1, the inner portion 144 may include wire mesh. Alternatively, the inner portion 144 may include any material that enables the platform 110 to function as described herein. In some examples, the platform 110 includes one or more rim segments 148 extending generally vertically from the peripheral portion 146 of the upper surface 142.

The mount 120 has a distal portion 152 coupled to the platform 110 and a proximal portion 154 opposite the distal portion 152. In some examples, the mount 120 is moveable between a retracted configuration and an extended configuration to adjust a length of the mount 120. For example, the distal portion 152 and/or proximal portion 154 may have a lockable telescoping configuration. As shown in FIG. 1, the mount 120 may include a vertical member 156 extending between the distal portion 152 and the proximal portion 154. In some examples, the mount 120 is moveable between a retracted configuration and an extended configuration (e.g., by using the vertical member 156) to adjust a height of the mount 120. For example, the vertical member 156 may have a lockable telescoping configuration.

The support 130 may include a plurality of vertical members 162. For example, at least a portion of the support 130 (e.g., a first vertical member 162) may extend generally vertically from one location, and another portion of the support 130 (e.g., a second vertical member 162) may extend generally from another location such that the support 130 defines a gap. As shown in FIG. 1, the first vertical member 162 may include a substantially planar plate 164 extending generally vertically from a proximal section 166 of the peripheral portion 146, and the second vertical member 162 may include a post 168 extending generally vertically from a location beyond the peripheral portion 146 (e.g., outside a footprint of the platform 110), such as the mount 120.

In some examples, the support 130 includes a securing mechanism 170 that is extendable between the vertical members 162. The securing mechanism 170 includes a pin or rod 172 sized and/or configured to extend through pin openings defined in each of the vertical members 162. The rod 172 may be bent at one end portion 174 or otherwise configured to restrict or prevent the entirety of the end portion 174 from sliding through the pin openings. As shown in FIG. 1, the securing mechanism 170 may include a retainer clip or lock sized and/or configured to extend through a lock opening defined in the rod 172 at another end portion 178 opposite the end portion 174. When the lock is extended through the lock opening when the rod 172 is extended through the pin openings, the rod 172 is restricted or prevented from being removed from the pin openings (e.g., by the bend at the one end portion 174 and by the lock at the other end portion 178).

The retainer 140 is moveable between an engaged configuration and a disengaged configuration. The retainer 140 may translate, for example, generally downwardly toward the engaged configuration and/or generally upwardly toward the disengaged configuration. In some examples, the retainer 140 includes one or more securing mechanisms 182 configured to secure the retainer 140 in the engaged configuration. As shown in FIG. 1, the securing mechanisms 182 may include one or more pins or rods 184 (e.g., threaded stud, bolt) extending upwardly from the platform 110 and through pin openings defined by a body 186 of the retainer 140, and one or more nuts 188 at an upper side of the body 186 and configured to engage the rods 184 for selectively keeping or securing the retainer 140 in the engaged configuration. The nuts 188 may be tightened (e.g., by rotating them in a clockwise direction) to decrease a distance between the nuts 188 and the upper surface 142 of the platform 110 for moving the retainer toward the engaged configuration. Conversely, the nuts 188 may be loosened (e.g., by rotating them in a counterclockwise direction) to increase a distance between the nuts 188 and the upper surface 142 of the platform 110 for moving the retainer toward the disengaged configuration.

The carrier assembly 100 may be coupled to a vehicle (not shown). The vehicle may include, for example, a hitch coupled to a frame or bumper of the vehicle. The hitch may include a tube defining a receiver opening that is sized and/or configured to receive at least a portion of the mount 120. The mount 120 has a length that enables the mount 120 to be spaced from the platform 110 from the vehicle. The carrier assembly 100 may be coupled to the vehicle such that the upper surface 142 of the platform 110 is generally at a first elevation and oriented to face generally an upward direction. The carrier assembly 100 may be coupled to the vehicle by inserting the proximal portion 154 of the mount 120 into the receiver opening defined by the tube.

The mount 120 includes a securing mechanism 212 that enables the proximal portion 154 to be securely coupled to the vehicle. The securing mechanism 212 includes a pin or rod 214 sized and/or configured to extend through pin openings defined in each of the hitch and the proximal portion 154. When the rod 214 is extended through the pin openings when the proximal portion 154 is inserted into the receiver opening and the pin openings are in alignment with one another, the mount 120 is restricted or prevented from being removed from the receiver opening. The rod 214 may be bent at one end portion 216 or otherwise configured to restrict or prevent the entirety of the end portion 216 from sliding through the pin openings (e.g., when the proximal portion 154 is inserted into the receiver opening and the pin openings are in alignment with one another).

In addition to securing the proximal portion 154 to the vehicle, the securing mechanism 212 may secure itself relative to the proximal portion 154 and/or hitch. The securing mechanism 212 may include a retainer clip or lock sized and/or configured to extend through a lock opening defined in the rod 214 at another end portion 220 opposite the end portion 216. When the lock is extended through the lock opening when the rod 214 is extended through the pin openings, the rod 214 is restricted or prevented from being removed from the pin openings (e.g., by the bend at the one end portion 216 and by the lock at the other end portion 220).

Figure 8:
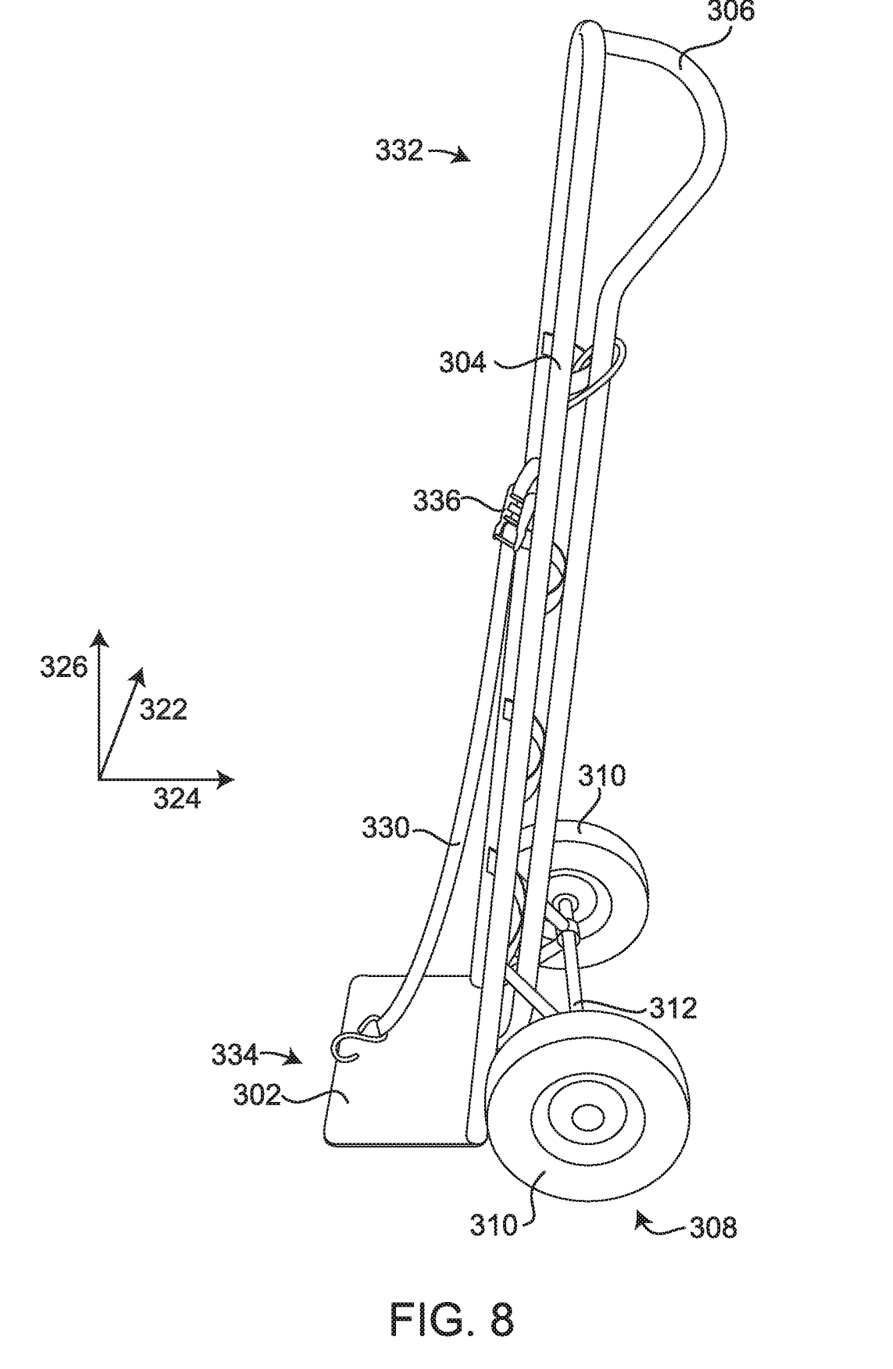
FIG. 8 is a side view of a hand truck that may be used with a carrier assembly, such as the carrier assembly shown in FIG. 1.

FIG. 8 shows an example hand cart, dolly, or hand truck 300 that may be transported using the carrier assembly 100. The hand truck 300 has an L-shaped configuration with a planar surface 302 at one leg, a frame 304 including one or more handles 306 at the other leg, and a wheel assembly 308 including a pair of wheels 310 and an axle 312 extending therebetween at or near the intersection of the two legs.

Figure 9:
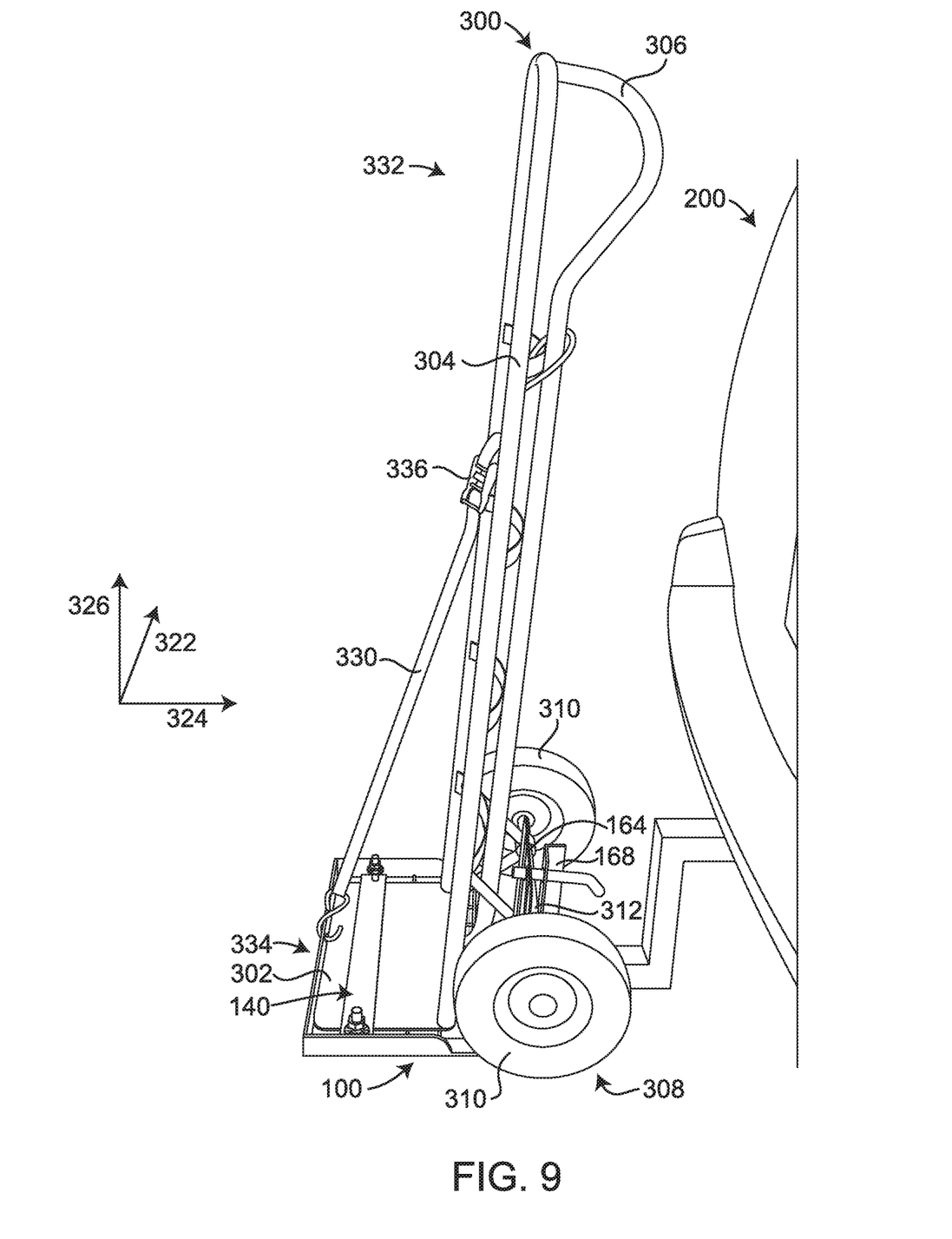
FIG. 9 is a side view of the hand truck shown in FIG. 8 with the carrier assembly shown in FIG. 1.

FIG. 9 shows the hand truck 300 supported by the carrier assembly 100. As shown in FIG. 9, the hand truck 300 may be positioned such that the planar surface 302 is above the inner portion 144 of the platform 110 (e.g., at the first elevation) and the rim segments 148 extend about the planar surface 302. In this manner, the rim segments 148 may restrict a horizontal movement (e.g., movement within a plane defined by an X-axis 322 and a Y-axis 324 as shown in FIG. 9) of the hand truck 300 when the hand truck 300 is supported at the first elevation (e.g., a position relative to a Z-axis 326 as shown in FIG. 9). Additionally or alternatively, the retainer 140 and/or support 130 may be used to restrict a horizontal movement of the hand truck 300 (e.g., when the hand truck 300 is supported at the first elevation). For example, the planar surface 302 may be positioned between the rods 184 of the retainer 140 such that the rods 184 confine the hand truck 300 along the X-axis 322 (i.e., the hand truck 300 may be restricted from moving along the X-axis 322), and the axle 312 may be positioned between the vertical members 162 of the support 130 (e.g., planar plate 164 and post 168) such that the vertical members 162 confine the hand truck along the Y-axis 324 (i.e., the hand truck 300 may be restricted from moving along the Y-axis 324).

Moreover, the planar surface 302 may be positioned below the body 186 of the retainer 140 such that the retainer 140 confines the hand truck 300 along the Z-axis 326 (i.e., the hand truck 300 may be restricted from moving along the Z-axis 326). Additionally or alternatively, the securing mechanism 170 of the support 130 may be extended between the vertical members 162 (e.g., along the Y-axis 324) when the axle 312 is extended between the vertical members 162 (e.g., along the X-axis 322) such that the securing mechanism 170 confines the hand truck 300 along the Z-axis 326.

Additionally, the carrier assembly 100 includes another securing mechanism 330 that may be extended between an upper portion 332 of the hand truck 300 and a distal section 334 of the peripheral portion 146 of the upper surface 142 (e.g., when the hand truck 300 is supported at the first elevation). The securing mechanism 330 may include a strap with a hook or other coupling mechanism at each end of the strap. In some examples, the securing mechanism 330 includes a biasing or tensioning mechanism 336 configured to manage or increase a tension (e.g., in the strap), forcing or biasing the frame 304 toward the plate 164 of the support 130 to further restrict a movement of the hand truck 300.

The carrier assembly 100 has a length and/or height that allows a rear hatch window of a vehicle to open and/or close (e.g., move between an open configuration and a closed configuration) when the hand truck 300 is supported at the first elevation. In some examples, the vertical member 156 has a height or "drop" that allows an upper elevation of the hand truck 300 (e.g., a second elevation) to be less than a height of the vehicle (e.g., when the hand truck 300 is supported at the first elevation).

Figure 10:
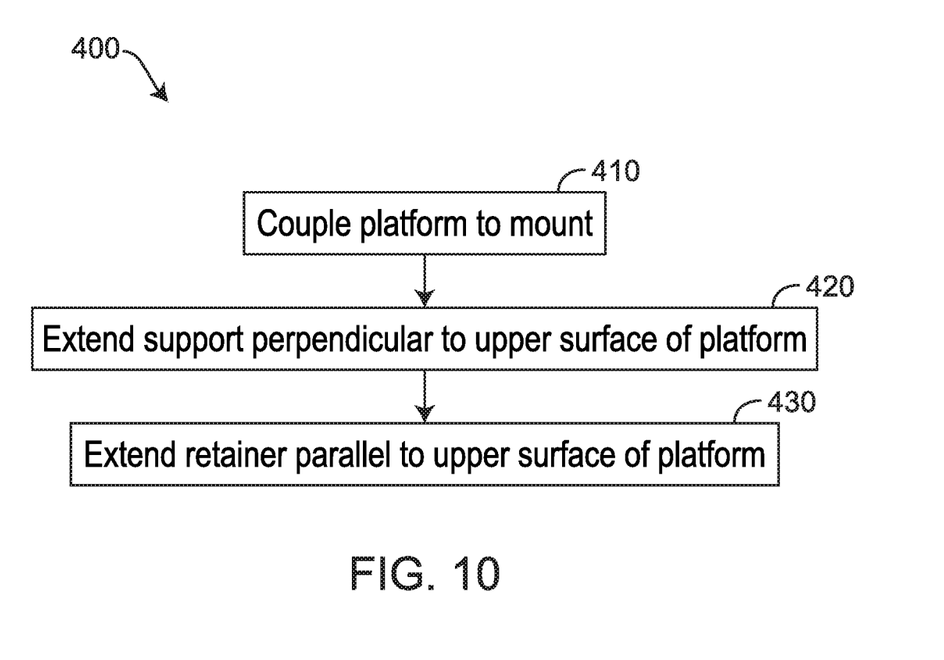
FIG. 10 is a flowchart of an example method of assembling a system for transporting one or more hand trucks.

FIG. 10 shows a method 400 of assembling a system for transporting one or more hand trucks, hand carts, and/or dollies (e.g., hand truck 300). A platform 110 is coupled to a mount 120 at operation 410. The platform 110 has an upper surface 142 configured to support a hand truck 300. The mount 120 is configured to couple the platform 110 to a vehicle such that the upper surface 142 is positioned to support the hand truck 300 at a first elevation.

A support 130 is extended generally perpendicular to the upper surface 142 of the platform 110 (e.g., at or adjacent to a proximal section 166 of a peripheral portion 146 of the upper surface 142) at operation 420. The support 130 is configured to restrict a movement of the hand truck 300 (e.g., in a horizontal direction) when the hand truck 300 is supported at the first elevation. In some examples, the support 130 includes a securing mechanism 170 that is configured to restrict a movement of the hand truck 300 (e.g., in a vertical direction) when the hand truck 300 is supported at the first elevation.

A retainer 140 is extended generally parallel to the upper surface 142 of the platform 110 (e.g., adjacent to a distal section 334 of the peripheral portion 146 of the upper surface 142) at operation 430. The retainer 140 is moveable between an engaged configuration and a disengaged configuration for selectively restricting a movement of the hand truck 300 when the hand truck 300 is supported by the system (e.g., at a first elevation). The retainer 140 is configured to restrict a movement of the hand truck 300 (e.g., in a vertical direction) when the hand truck 300 is supported at the first elevation. In some examples, the retainer 140 includes one or more securing mechanisms 182 configured to secure the retainer 140 in the engaged configuration. Additionally, a securing mechanism 330 (e.g., a strap) may be extended between an upper portion 332 of the hand truck 300 and the distal section 334 of the peripheral portion 146 to restrict a movement of the hand truck 300.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While aspects of the disclosure have been described in terms of various examples with their associated operations, a person skilled in the art would appreciate that a combination of operations from any number of different examples is also within the scope of the aspects of the disclosure.

What is claimed is:

1. A carrier assembly for transporting one or more hand trucks, the carrier assembly comprising:

a platform having an upper surface configured to support a hand truck;

a mount configured to couple the platform to a vehicle such that the upper surface of the platform is positioned to support the hand truck at a first elevation;

a support extending generally perpendicular to the upper surface of the platform, the support including a plurality of vertical members spaced to define a gap sized to receive a portion of the hand truck therein, the support configured to restrict a movement of the hand truck when the hand truck is supported at the first elevation; and a retainer extending generally parallel to the upper surface of the platform, the retainer moveable between an engaged configuration and a disengaged configuration, the retainer configured to restrict a movement of the hand truck when the hand truck is supported at the first elevation.

2. The carrier assembly of claim 1, wherein the upper surface has an inner portion and a peripheral portion extending about the inner portion, the inner portion being water-permeable.

3. The carrier assembly of claim 2, wherein the inner portion includes a wire mesh.

4. The carrier assembly of claim 1, wherein the platform has one or more rim segments extending generally vertically from a peripheral portion of the upper surface.

5. The carrier assembly of claim 1, wherein at least a portion of the support extends generally vertically from a proximal section of a peripheral portion of the upper surface.

6. The carrier assembly of claim 1, wherein the support includes a substantially planar plate extending generally vertically from a peripheral portion of the upper surface.

7. The carrier assembly of claim 1, wherein the support includes a post.

8. The carrier assembly of claim 1, wherein the support includes a plurality of vertical members and a securing mechanism extendable between the vertical members.

9. The carrier assembly of claim 1, wherein the retainer includes a securing mechanism including a bend at one end portion, the securing mechanism configured to secure the retainer in the engaged configuration.

10. The carrier assembly of claim 1, wherein the retainer extends laterally across the upper surface of the platform.

11. The carrier assembly of claim 1, wherein the retainer translates between the engaged configuration and the disengaged configuration.

12. The carrier assembly of claim 1, further comprising a securing mechanism extending between an upper portion of the hand truck and a distal section of a peripheral portion of the upper surface.

13. The carrier assembly of claim 1, wherein the mount has a proximal portion in which one or more openings are defined, and a securing mechanism extending through the openings to securely couple the proximal portion to the vehicle.

14. The carrier assembly of claim 1, wherein the mount has a distal portion coupled to the platform and a proximal portion coupleable to the vehicle such that the mount is configured to space the platform from the vehicle.

15. The carrier assembly of claim 1, wherein the mount is moveable to adjust a length of the mount.

16. The carrier assembly of claim 1, wherein the mount has a distal portion coupled to the platform, a proximal portion coupleable to the vehicle, and a vertical member extending between the distal portion and the proximal portion.

17. The carrier assembly of claim 1, wherein the mount is moveable to adjust a height of the mount.

18. A method of assembling a system for transporting one or more hand trucks, the method comprising:

coupling a platform to a mount, the platform having an upper surface configured to support a hand truck, the mount configured to couple the platform to a vehicle such that the upper surface of the platform is positioned to support the hand truck at a first elevation;

extending a support generally perpendicular to the upper surface of the platform, the support including a plurality of vertical members spaced to define a gap sized to receive a portion of the hand truck therein, the support configured to restrict a movement of the hand truck when the hand truck is supported at the first elevation; and extending a retainer generally parallel to the upper surface of the platform, the retainer moveable between an engaged configuration and a disengaged configuration, the retainer configured to restrict a movement of the hand truck when the hand truck is supported at the first elevation.

19. The method of claim 18 further comprising extending a securing mechanism between an upper portion of the hand truck and a distal section of a peripheral portion of the upper surface, the hand truck supported at the first elevation.

20. A carrier assembly for transporting one or more hand trucks, the carrier assembly comprising:

a platform having an upper surface configured to support a hand truck;

a mount configured to couple the platform to a vehicle such that the upper surface of the platform is positioned to support the hand truck at a first elevation;

a support extending generally perpendicular to the upper surface of the platform, the support including a substantially planar plate extending generally vertically from a peripheral portion of the upper surface, the support configured to restrict a movement of the hand truck when the hand truck is supported at the first elevation; and a retainer extending generally parallel to the upper surface of the platform, the retainer moveable between an engaged configuration and a disengaged configuration, the retainer configured to restrict a movement of the hand truck when the hand truck is supported at the first elevation.

* * * * *